United States Patent
May

[15] 3,686,935
[45] Aug. 29, 1972

[54] METHOD AND APPARATUS FOR MONITORING THE PERFORMANCE OF A DRAFT VEHICLE

[72] Inventor: Oswald May, Bonn, Germany

[73] Assignee: Klockner-Humboldt-Deutz Aktiengesellschaft, Koln-Deutz, Germany

[22] Filed: Nov. 17, 1970

[21] Appl. No.: 90,288

[30] Foreign Application Priority Data

Dec. 2, 1969 Germany..........P 19 60 298.3

[52] U.S. Cl. .....................73/112, 73/117.3, 73/118
[51] Int. Cl. ..............................................G01l 3/26
[58] Field of Search..........73/112, 117.3, 117.2, 116, 73/118

[56] References Cited

UNITED STATES PATENTS 2,975,633 3/1961 Hautzenroeder............73/118
2,521,322 9/1950 Baadte...............73/117.3 UX
2,290,618 7/1942 Bosomworth................73/146

Primary Examiner—Jerry W. Myracle
Attorney—Walter Becker

[57] ABSTRACT

A draft vehicle, especially for agricultural use, having an engine, preferably of the fuel injection type, and driving wheels and a transmission connecting the engine to the wheels and including a torque converter. Measuring elements measure the circumferential speed of the driving wheels, the speed of the vehicle, the speed of the engine, the rate of fuel supply to the engine, the torque supplied to the converter and the torque supplied by the converter. The thus measured values are compared to obtain values representative of the slip of the driving wheels and the efficiency of the engine and the efficiency of the converter. Indicators supplied with the obtained values are disposed within the view of the vehicle operator.

7 Claims, 1 Drawing Figure

PATENTED AUG 29 1972 3,686,935
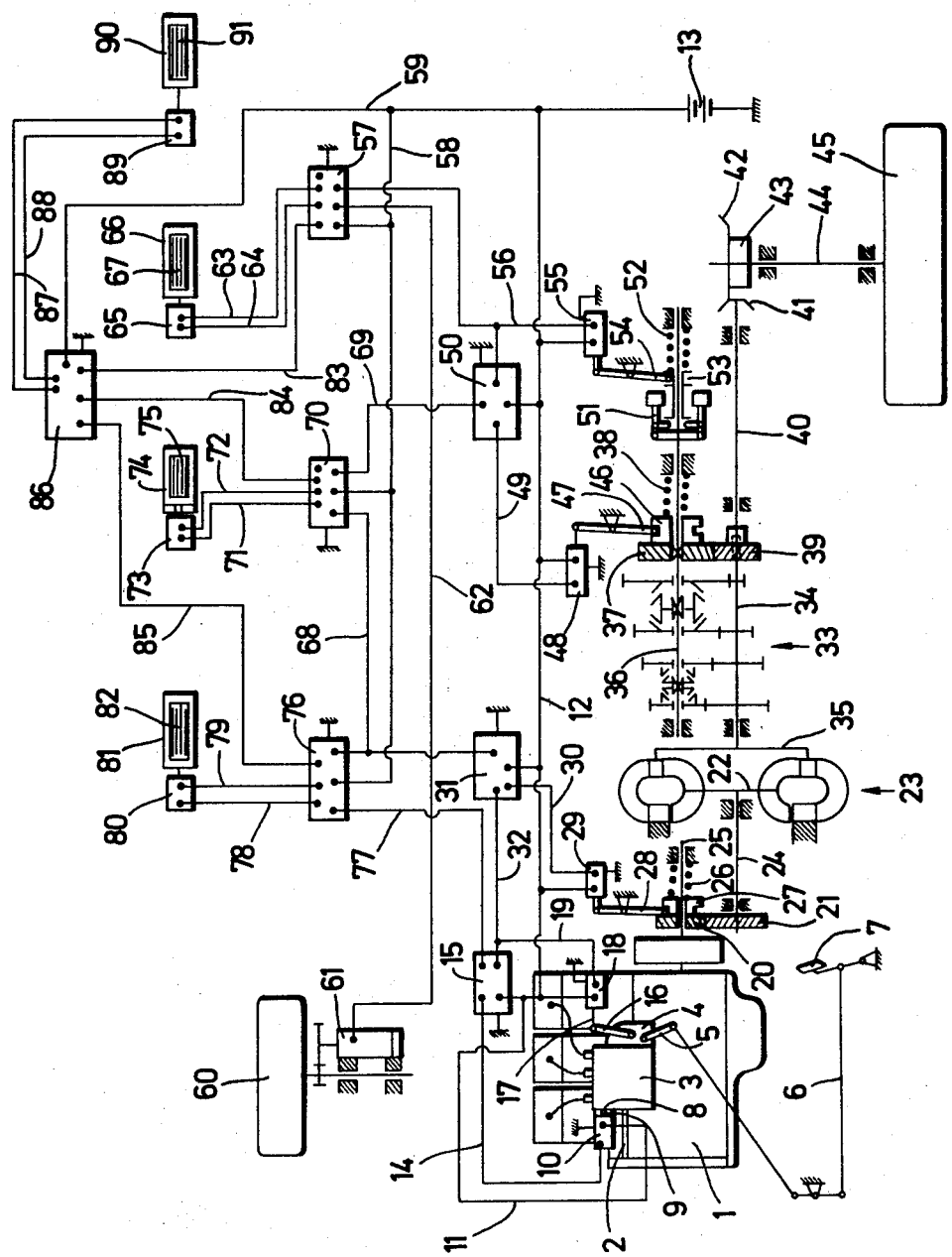
INVENTOR
Oswald May
BY
Walter Buky

METHOD AND APPARATUS FOR MONITORING THE PERFORMANCE OF A DRAFT VEHICLE

The present invention relates to a device for checking the degree of efficiency of a motor vehicle adapted to be used in agriculture and equipped with a driving engine, preferably a fuel injection internal combustion engine, the output of which is through a torque converter conveyed to the driving wheels of the vehicle.

When working the soil by means of a vehicle adapted to be used in agriculture and having arranged thereon a working implement, the problem arises of obtaining a maximum power per unit surface at an optimum degree of efficiency of the vehicle with a preselected working depth. Inasmuch as during the working of the soil the soil conditions continuously change with regard to the soil density and the soil texture, the driver has very frequently to change the engine output and the converter ratio of the torque converter in order to place the vehicle under the optimum load. With heretofore known vehicles of the type involved the driver, in view of the lack of appropriate gauges, is unable to check whether the vehicle moves the working implement with a minimum of slip and a maximum degree of efficiency of the driving engine and of the torque converter.

In an effort to solve this problem, it has been suggested with a tractor having a multistage change gear transmission arranged behind the internal combustion engine to provide the tractor with a device of the above mentioned type which can be clearly observed by the driver and which comprises a gauge indicating the speed of the internal combustion engine and the preselected control stage of the change gear transmission. The speed scale of the speed gauge is so arranged with regard to a roller with scale bands, which roller is adjustable by a control member of the change gear transmission, that a pointer will indicate to the driver whether or not the optimum control stage is engaged which corresponds to the respective speed of the internal combustion engine. Such a device, however, is unsatisfactory inasmuch as the driver does not have the possibility of checking whether the internal combustion engine and the torque converter are under the optimum load and in particular the driver cannot ascertain the slip conditions on the driving wheels. Therefore, the slip with which the power adjusted in conformity with the driver's own judgement is through the driving wheels conveyed to the soil, is fully dependent on the skill of the driver.

Starting from the above mentioned state of the art, it is an object of the present invention so to improve a device of the above referred to type while using structurally simple elements that the driver will be able to ascertain the slip condition on the driving wheels and the degree of efficiency at which the driving engine and the torque converter operate.

It is another object of this invention to provide a device as set forth in the preceding paragraph, which will be so designed that the gauges for ascertaining the power and torques can also be used for other purposes.

These and other objects and advantages of the invention will appear more clearly from the following specification in connection with the accompanying drawing diagrammatically illustrating a device according to the present invention.

The device according to the present invention is characterized primarily by a combination of the following features:

a. An electric calculator which is adapted to ascertain the slip of the driving wheels and which is operatively connected to an emitter ascertaining the slip-affected circumferential speed of the driving wheels and is furthermore operatively connected to an emitter adapted to ascertain the slip-free circumferential speed of a wheel moved by the vehicle and which optically indicates the driving slip.

b. A gauge ascertaining the indicated power of the internal combustion engine, preferably with an emitter for the speed and the quantity of the injected fuel of the internal combustion engine.

c. A gauge adapted to ascertain the driving torque and the input torque and the output torque of the torque converter.

d. The speed emitter of the internal combustion engine and the emitter ascertaining the input torque of the torque converter are operatively connected to a power measuring element.

e. The power measuring elements for ascertaining the indicated power of the internal combustion engine and for ascertaining the driving power of the torque converter are connected to a calculating device adapted to calculate the total degree of efficiency of the internal combustion engine and to indicate the same.

f. The power measuring element ascertaining the driving power of the torque converter is connected to a calculating device with an optical indication of the degree of efficiency which calculating device is operatively connected to a further power measuring element having connected thereto the driving torque of the torque converter and the emitter ascertaining the slip-affected circumferential speed.

Due to the cooperation of the above mentioned elements, the driver will be able continuously to ascertain the slip prevailing at the driving wheels and also to check at which degree of efficiency the internal combustion engine and the torque converter work. The driver will, therefore, be in a position to effect corresponding corrections in the adjustment of the power control member of the fuel injection internal combustion engine and of the converter conditions of the torque converter. The speed measuring element for the internal combustion engine and the speed measuring element for ascertaining the slip-affected circumferential speed will in addition to the measuring element for ascertaining the output torque of the internal combustion engine be available for a multi-purpose use.

An advantageous further development of the device according to the invention consists in that the calculating device ascertaining the slip of the driving wheels, the calculating device ascertaining the degree of efficiency of the internal combustion engine and the calculating device ascertaining the degree of efficiency of the torque converter will be operatively connected to a device adapted to convert the calculated individual degrees of efficiency into a single value and optically to indicate the total degree of efficiency of the vehicle. This furnishes the driver with the possibility continuously to check at which total degree of efficiency the vehicle is working. In this connection it is expedient that the devices indicating the slip and the degrees of efficiency are arranged on a control panel in clear view of the driver.

Referring now to the FIGURE in detail, the device shown therein is arranged in a motor vehicle which latter comprises a fuel injection internal combustion engine 1 with a fuel injection pump 3 which is driven through the intervention of a shaft 2. Pump 3 is equipped with a speed control governor 4 the speed measuring mechanism of which together with the control spring pertaining thereto are not illustrated. The preload of the control spring for changing the speed of the fuel injection internal combustion engine 1 is adapted to be varied by means of a lever 5 in cooperation with a linkage 6 through the intervention of a manually or foot operable lever 7. The speed measuring mechanism is adapted through non-illustrated intermediate members to act upon a control rod 8 which determines the injected quantity of fuel and thereby the indicated torque of the engine 1. Rod 8 is connected to the movable arm 9 of a potentiometer 10 having a logarithmic characteristic. Potentiometer 10 is through a conductor 11 connected to a line 12 which in its turn is connected to a source 13 of voltage. Furthermore, the potentiometer 10 has its logarithmic output connected through a line 14 with an electric calculating device 15 which comprises an addition circuit and serves for calculating the indicated power of the engine 1. The speed required for calculating the indicated power of the internal combustion engine is by the speed measuring member of the speed control governor 4 conveyed to a sliding contact 17 of a potentiometer 18 which latter is connected to the line 12 and to ground. The logarithmic output of the potentiometer 18 is through a line 19 connected to the calculating device 15.

The power of the driving engine 1 is through a gear transmission having gears 20, 21 with inclined teeth conveyed to shaft 24 of a hydrodynamic torque converter 23 which is connected to the primary part 22. Gear 20 is non-rotatably mounted on a shaft 25 but is axially displaceable thereon and is preloaded in the direction of the engine 1 by a spring 26 serving as torque measuring element. The axial displacement of the gear 20 resulting in response to a change in the output torque of the internal combustion engine is conveyed through a lever 28 to the slide arm of a potentiometer 29 with a logarithmic characteristic. Lever 28 is guided in a sleeve 27 and is pivotable about a fixed axis. The potentiometer 29 is connected to the line 12 and to ground. The logarithmic outlet of the potentiometer 29 is through a line 30 connected to an electric calculating device 31 which has an addition circuit, connected to ground and through a line 32 is connected with line 19 and through line 12 is connected with the voltage source 13. The calculating device 31 serves for ascertaining the power conveyed by the internal combustion engine to the driving mechanism of the motor vehicle. In addition to the hydrodynamic torque converter 23, the driving mechanism of the motor vehicle comprises a multistage change gear transmission 33 which follows the driving mechanism of the motor vehicle and the drive shaft 34 of which is connected to the secondary part 35 of the hydrodynamic torque converter 23. From the drive shaft 34, the torque is conveyed through gears to a counter shaft 36 with control jaws. A gear 37 with inclined teeth is non-rotatably mounted on the counter shaft 36 in addition to the gears forming the control stages. Gear 37 is, however, axially displaceable on shaft 36 and rests on a spring 38 which ascertains the given off torque of the driving mechanism. Gear 37 meshes with the gear 39 likewise equipped with inclined teeth in which one end of the drive shaft 34 is journalled. Gear 39 is connected to an output shaft 40 by means of which through a bevel gear 41, gear 42 of a differential 43 and plug axles 44 on both sides, driving wheels 45 are driven. The axial displacement resulting from a change in the torque of the driving mechanism for gear 37 is conveyed through a lever 47 having one end guided in sleeve 46, and is conveyed to the sliding contact of a potentiometer 48 with a logarithmic characteristic, said potentiometer being connected to ground as well as to the line 12. From the logarithmic exit of the potentiometer 48, the torque values are through a line 49 conveyed to an electric calculating device 50 with an addition circuit which is connected to ground and through line 12 is connected to the voltage source 13. The calculating device 50 serves for ascertaining the power conveyed by the driving mechanism to the driving wheels 45. The speed value necessary for calculating the power is ascertained by the counter shaft 36 of the gear change transmission through the intervention of a speed measuring element formed by the centrifugal pendulum measuring mechanism 51 which latter is preloaded by a spring 52. The adjusting stroke of the speed measuring element resulting from a change in the speed of the counter shaft is conveyed by a sleeve 53 to a lever 54, said sleeve resting on a spring 52. Lever 54 is coupled to the slide arm of a potentiometer 55 with a logarithmic characteristic. The speed values are from the logarithmic exit of the potentiometer 55 conveyed through a line 56 to the calculating device 50.

The speed measuring element 51 likewise serves as measuring element for ascertaining the slip-affected circumferential speed of the driving wheels 45 the slip of which is calculated by an electric calculating device 57 with an addition circuit. The speed of the speed measuring element 51 which speed is proportional to the slip-affected circumferential speed of the driving wheels 45, is fed into the calculating device 57 through a potentiometer 55 with a logarithmic characteristic and by the latter is fed through line 56. The calculating device 57 for the slip is furthermore connected to ground and through a line 58 and 59 is connected to the voltage source 13. The slip-free circumferential speed necessary for calculating the drive wheel slip is tapped by a wheel 60 movable by the tractor, which wheel may be represented, for instance, by the non-driven steered wheel of a control vehicle or by the supporting wheel of a device adapted to be attached. The speed of the slip-free wheel 60 is conveyed to a tachogenerator 61 equipped with an electric converter by means of which the voltage ascertained proportionally with regard to the speed is converted to logarithmic voltage and through a line 62 is conveyed to the calculating device 57. The electrically ascertained slip is by the calculating device 57 through lines 63, 64 conveyed to the electric control member 65 of an indicating device 66 which has a preferably roller-shaped scale drum 67 within the viewing range of the driver. The scale drum 67 is adapted to indicate the slip in percent. The calculating device 57 may preferably together with the control member 65 and the indicating device form a structural unit which is arranged on a control panel.

The two calculating devices 31 and 50 convey the output calculated by the addition circuit, namely the output power of the engine 1 and the output power of the transmission, through logarithmic exits, and furthermore through a line 68, 69 convey the calculated power to a calculating device 70 with a subtraction circuit which is connected to line 58. The calculating device 70 conveys the degree of efficiency determined by the logarithmic dividing of the output power of the driving mechanism by the input power thereof in the form of an electric factor through linear exits to the control member 73 of an indicating device 74 adapted to indicate the degree of efficiency of the driving mechanism, the said linear exits being connected to the lines 71 and 72. The indicating device 74 likewise has a scale drum 75 with a percent division.

Connected through a line 68 to the calculating device 31 adapted to ascertain the output power of the internal combustion engine 1 is a calculating device 76 with a logarithmic input and a subtraction circuit. The device 76 serves for calculating the total degree of efficiency of the internal combustion engine 1. The device 76 is likewise supplied with current by the voltage source 13 through a line 58, said device 76 being connected to a branch line to ground. The indicated power of the internal combustion engine 1 is by the calculating device 15 through a line 77 fed into the calculating device 76. The total degree of efficiency of the internal combustion engine ascertained by calculating device 76 by logarithmically dividing the two power values, is through linear exits and through lines 78, 79 connected thereto conveyed to the control member 80 of an indicating device 81. The indicating device 81 which is preferably arranged within the viewing range of the driver likewise has a scale drum 82 equipped with a percent division.

In addition to the linear exits, the calculating devices 57, 70 and 76 also have logarithmic exits to which are connected the logarithmic inputs of a calculating device 86 with an addition circuit. The calculating device 86 serves for electrically multiplying the individual degrees of efficiency ascertained by the calculating devices 57, 70 and 76. From the calculating device 86 which is connected to ground and through line 59 is connected to the voltage source 13, the formed measuring value for the total degree of efficiency is through linear exits 87, 88 conveyed to the control member 89 of an indicating device 90 indicating the total degree of efficiency. The indicating device 90 preferably has a scale drum 91 with a percent scale.

It may be mentioned that instead of the potentiometers 10, 18, 29, 48 and 55 with logarithmic characteristic as described in connection with the drawing, also potentiometers with a linear characteristic may be employed. In such instances, however, the calculating devices 15, 31 and 90 must have an electric multiplication circuit, and the next following calculating devices 57, 70 and 76 must have linear inputs and must be provided with an electric division circuit. When connecting the calculating device 86 to linear exits of the calculating devices 57, 70 and 76, it is necessary for ascertaining the total degree of efficiency to connect the calculating devices to an electric multiplication circuit.

It is, of course, to be understood that the present invention is, by no means, limited to the particular showing in the drawing but also comprises any modifications within the scope of the appended claims.

What is claimed is:

1. In a vehicle, especially a draft vehicle for agricultural use and having a driving engine, driving wheels and transmission means connecting the engine to the driving wheels and including a torque converter; first means operable to measure the slip of said driving wheels, second means operable to measure the efficiency of said engine, third means operable to measure the efficiency of said converter, and first, second and third indicators connected to said first, second and third means for indicating the measured values.

2. A vehicle according to claim 1 which includes fourth means connected to said first, second and third means to measure the overall efficiency of said vehicle, and a fourth indicator connected to said fourth means to indicate the value measured thereby.

3. A vehicle according to claim 2 which includes a control panel within the view of the operator of the vehicle and on which said indicators are mounted.

4. A vehicle according to claim 1 which said first, second and third means comprises a first measuring means measuring the circumferential speed of said driving wheels, a second measuring means measuring the speed of said vehicle, a third measuring means measuring the rate of fuel supply to said engine, a fourth measuring means measuring the speed of said engine, a fifth measuring means measuring the torque at the input side of said converter, a sixth measuring means measuring the torque at the output side of said converter, each said measuring means supplying a respective output signal in conformity with the value measured thereby; a first component receiving signals from said first and sixth measuring means, a second component receiving signals from said third and fourth measuring means, a third component receiving signals from said fourth and fifth measuring means, each component supplying an output signal in conformity with the product of the signals received thereby; a first calculator receiving signals from said first and second measuring means, a second calculator receiving signals from said second and third components, and a third calculating receiving signals from said first and third components, each calculator supplying an output signal in conformity with the quotient of the signals received thereby; and said first, second and third indicators being connected to receive the output signals from said first, second and third calculators, respectively.

5. A vehicle according to claim 4 in which the output signal from each said measuring means and from each said component varies according to a logarithmic scale.

6. A vehicle according to claim 4 in which said transmission means includes a shiftable gear transmission interposed between said torque converter and said driving wheels.

7. The method of monitoring the operation of a draft vehicle having an engine and driving wheels and a torque converter connecting the engine to the wheels which comprises in combination: continuously measuring the circumferential speed of the driving wheels, the speed of the vehicle, the speed of the engine, the rate of fuel supply to the engine, the torque supplied to the converter, and the torque supplied by the converter; continuously comparing the values thus measured to obtain values representing the slip of said wheels, the efficiency of the engine, and the efficiency of said converter; and indicating the thus obtained measured values simultaneously for the benefit of the vehicle operator monitoring.

* * * * *